United States Patent [19]
Horiuchi

[11] Patent Number: 5,220,597
[45] Date of Patent: Jun. 15, 1993

[54] DIALING APPARATUS FOR POWER FAILURE EXTENSION TELEPHONE SET OF KEY TELEPHONE SYSTEM

[75] Inventor: Takeshi Horiuchi, Hachioji, Japan

[73] Assignee: Kabushiki Kaisha Toshiba, Kawasaki, Japan

[21] Appl. No.: 682,940

[22] Filed: Apr. 10, 1991

[30] Foreign Application Priority Data

Apr. 11, 1990 [JP] Japan ................................. 2-95591

[51] Int. Cl.⁵ .......................................... H04M 1/72
[52] U.S. Cl. .................................. 379/362; 379/368; 379/365; 379/156
[58] Field of Search ............... 379/156, 157, 165, 166, 379/359, 362, 364, 365, 368, 369, 413, 387

[56] References Cited

U.S. PATENT DOCUMENTS

| | | | |
|---|---|---|---|
| 4,317,968 | 3/1982 | Kuhfus | 379/369 |
| 4,328,399 | 5/1982 | Perks et al. | 379/368 |
| 4,349,705 | 9/1982 | Kuhfus | 379/368 |
| 4,392,024 | 7/1983 | Shinoi et al. | 379/364 |
| 4,845,748 | 7/1989 | Bohannon | 379/369 |
| 5,014,302 | 5/1991 | Kappeler et al. | 379/165 |

Primary Examiner—Thomas W. Brown
Assistant Examiner—M. Shehata
Attorney, Agent, or Firm—Foley & Lardner

[57] ABSTRACT

Disclosed is a dialing apparatus used for a power failure extension telephone set 30 in a key telephone system. The power failure extension telephone set 30 is driven by power supplied from a key service unit 2 so as to function as an extension telephone set when power is supplied to the key service unit 2, but directly connected to an office telephone line 1 so as to function as an individual telephone set when power is not supplied to the key service unit 2. The dialing apparatus comprises a dial switch 31 of single contact-layer structure and a control switch circuit 21 connected to the dial switch 31 and changed over according to the power supply or power failure condition of the key service unit. That is, when power is supplied to the key service unit 2, the control switch circuit 21 connects the dial switch 31 to a control circuit 19. This control circuit 19 is activated by power supplied from the key service unit 2 and detects the state of the dial switch to transmit a control signal to the key service unit. On the other hand, when power is not supplied to the key service unit 2, the control switch circuit 21 connects the dial switch 31 to a dial signal transmit circuit 20. This dial signal transmit circuit 20 is activated by power supplied through an office telephone line 1 and detects the state of the dial switch whenever a handset 16 is off-hooked, to transmit a call to the office telephone line 1.

6 Claims, 6 Drawing Sheets

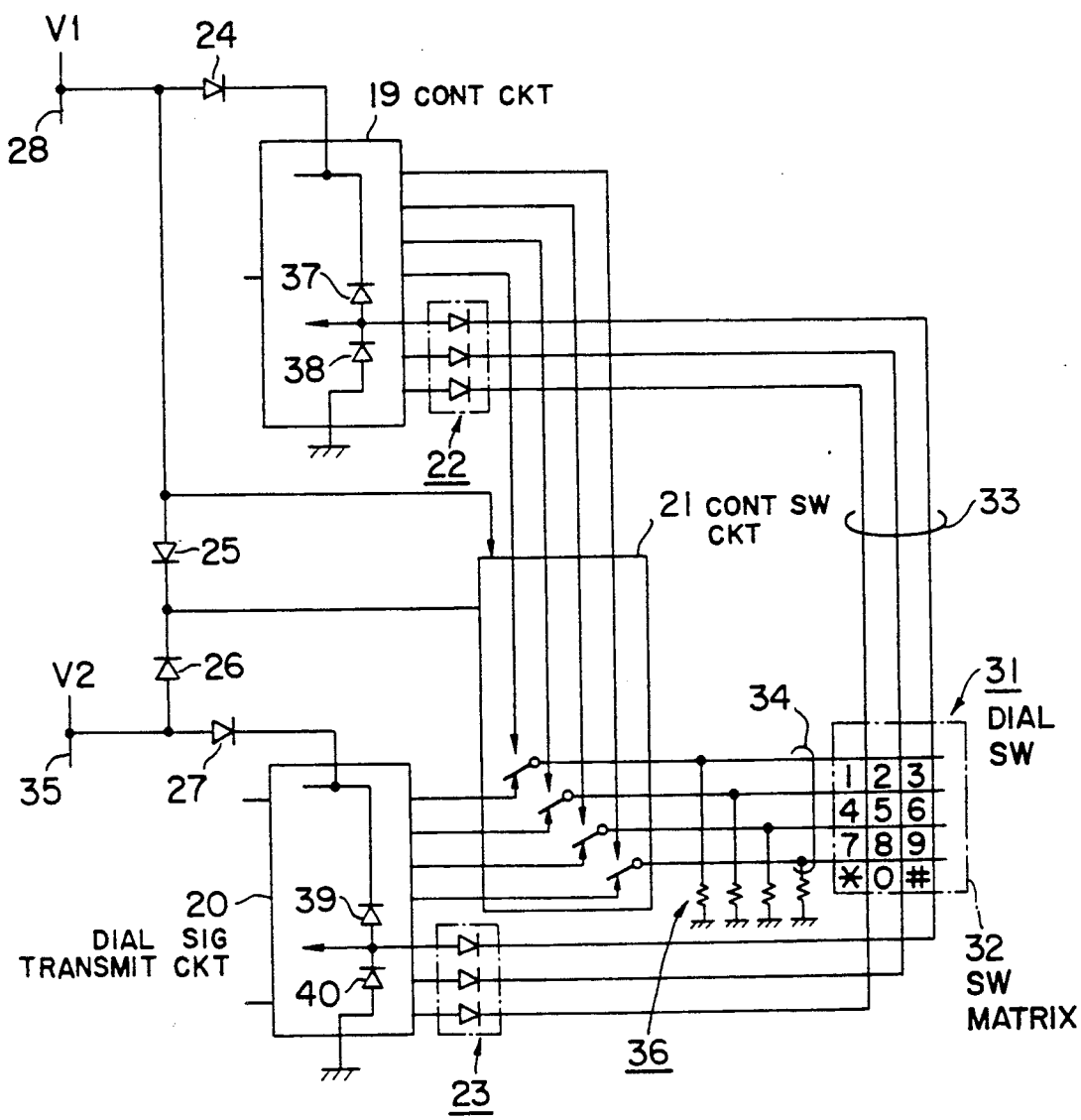
F I G. 5

DIALING APPARATUS FOR POWER FAILURE EXTENSION TELEPHONE SET OF KEY TELEPHONE SYSTEM

BACKGROUND OF THE INVENTION

The present invention relates to an improvement in a dialing apparatus provided for an extension telephone set of a key telephone system.

In the case of a key telephone system, a key service unit provided with exchange and control functions is connected to at least one office line, and further a plurality of extension telephone sets are connected to the key service unit via a speech signal line and a control signal line, respectively. In general, the key service unit receives power from a commercial power supply, and each extension telephone set receives the commercial power from the key service unit via the signal line. Accordingly, when the commercial power fails in the key service unit, various functions of the key telephone systems are disabled.

In the key telephone system, however, since there exists a need for maintaining at least the functions of an individual telephone set even during power failure (i.e. the individual telephone set can be connected directly to the office line for providing telephone service), in some cases power failure extension telephone sets provided with the functions of not only an extension telephone set but also an individual telephone set are used.

FIG. 1 shows the configuration of a prior-art power failure extension telephone set. In the drawing a power failure extension telephone set 5 is connected to a key service unit 2 via a control signal line 3 and a speech signal line 4, and the key service unit 2 is connected to an office line 1. The key service unit 2 is provided with a line switching circuit 6. This line switching circuit 6 connects the output of a power supply circuit 29 to the signal lines 3 and 4 to supply power from the key service unit 2 to the telephone set 5 when commercial power is supplied, but connects the office line 1 directly to the signal lines 3 and 4, as shown in FIG. 1, when commercial power fails.

The power failure extension telephone set 5 is generally provided with a speech circuit 10 and a control circuit 19 (both incorporated in an ordinary extension telephone set and activated by power supplied through the key service unit 2) and a telephone circuit 15 and a dial signal transmit circuit 20 (both incorporated in an ordinary individual telephone set and activated by power supplied through the office line 1). In addition, this prior-art power failure telephone set 5 is provided with two switching circuits 13 and 17 for switching the function of the telephone set 5 from the extension telephone set to the individual telephone set or vice versa according to the power supply or power failure condition.

In the telephone set 5, when the commercial power is being supplied, a voltage stabilizer 12 is connected to the signal lines 3 and 4 via the switching circuit 13 to supply power from the key service unit 2 to the speech circuit 10 and the control circuit 19. Further, a handset 16 is connected to the speech circuit 10 via the switching circuit 17. Therefore, the power failure telephone set 5 functions as an extension telephone set.

On the other hand, when the commercial power fails, the switching circuits 13 and 17 are switched as shown in FIG. 1, so that the telephone circuit 15 and the dial transmit circuit 20 are connected to the signal lines 3 and 4 and further the signal lines 3 and 4 are directly connected to the office line 1 through the key service unit 2. In addition, the handset 16 is connected to the telephone circuit 15. Therefore, the power failure telephone set 5 functions as an individual telephone set.

In the prior-art power failure extension telephone set as described above, a push-button dial switch 18 of double contact-layer structure is adopted to transmit each different dial signal when the telephone set functions as an extension telephone set and as an individual telephone set, respectively. In more detail, the dial switch 18 is formed of two 3×4 switch matrix of double contact-layer structure, so that each contact layer functions for each of the extension telephone set and the individual telephone set. In other words, a first contact matrix 18a of the contact group for the extension telephone set is connected to the control circuit 19 for the extension telephone set, and a second contact matrix 18b of the contact group for the individual telephone set is connected to the dial signal transmit circuit 20 for the individual telephone set, separately.

In the prior-art power failure telephone set, since a dial switch 18 of complicated double contact-layer structure is adopted, there exists a problem in that erroneous dialing operation occurs due to malconnection when the dial switch 18 is depressed roughly as when corners of each dial button are depressed. To overcome this problem, it may be possible to adopt a highly reliable dial switch which will not cause malconnection even if the dial button is depressed at a corner thereof. In this case, however, another problem arises in that high quality manufacturing technology will be required and therefore the cost of the dial switch inevitably increases.

SUMMARY OF THE INVENTION

Therefore, the object of the present invention is to provide a dialing apparatus for a power failure extension telephone set of a key telephone system, which is simple in structure and high in reliability.

To achieve the above-mentioned object, the present invention provides a dialing apparatus for a power failure extension telephone set connected to a key service unit of a key telephone system, the telephone set being driven by power supplied through the key service unit in a power supply condition of the key service unit so as to function as an extension telephone set and directly connected to an telephone line in a power failure condition of the key service unit so as to function as an individual telephone set, comprising:

a dial switch having a switch matrix of a single contact layer structure;

a control switch circuit connected to said dial switch and switched according to the power supply or power failure condition of the key service unit;

a control circuit activated by power from the key service unit in the power supply condition of the key service unit and connected to said dial switch via said control switch circuit, for detecting a state of said dial switch to transmit a control signal to the key service unit; and a dial signal transmit circuit activated by power through the office telephone line in the power failure condition of the key service unit and connected to said dial switch circuit via said control switch circuit, for detecting a state of said dial switch to transmit a call to the telephone line.

In the dialing apparatus according to the present invention, since the dial switch of a single contact-layer structure can be used in common, irrespective of the commercial power supply or failure condition, it is possible to simplify the structure of the dial switch and also to prevent erroneous dialing operation.

BRIEF DESCRIPTION OF THE DRAWINGS

FIG. 5 is a block diagram showing the dialing apparatus in the power failure extension telephone set shown in FIG. 2;

DETAILED DESCRIPTION OF THE PREFERRED EMBODIMENTS

Embodiments of the dialing apparatus according to the present invention will be described with reference to the attached drawings.

Figure 1:
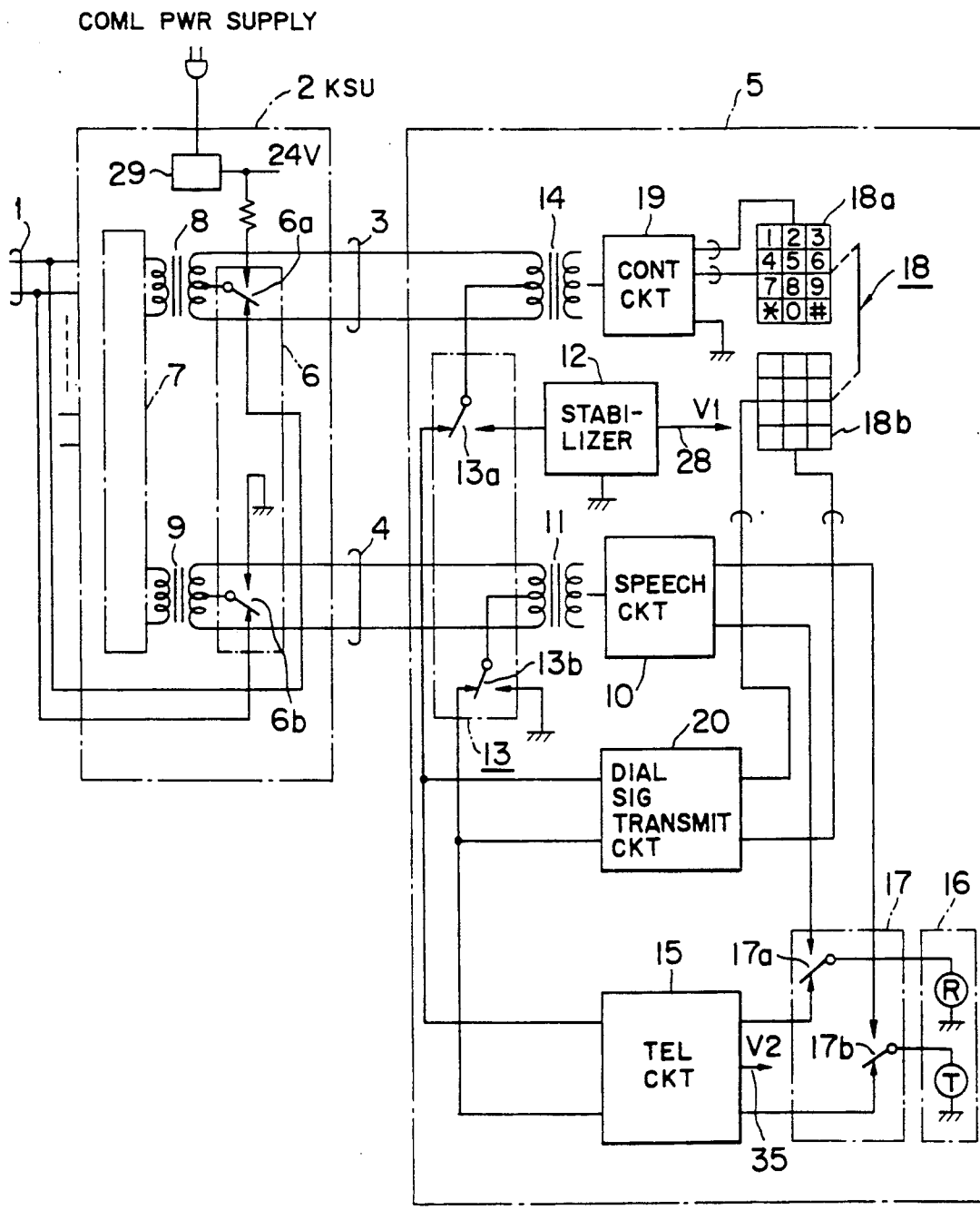
FIG. 1 is a block diagram showing a key telephone system provided with a prior-art power failure extension telephone set.
Figure 2:
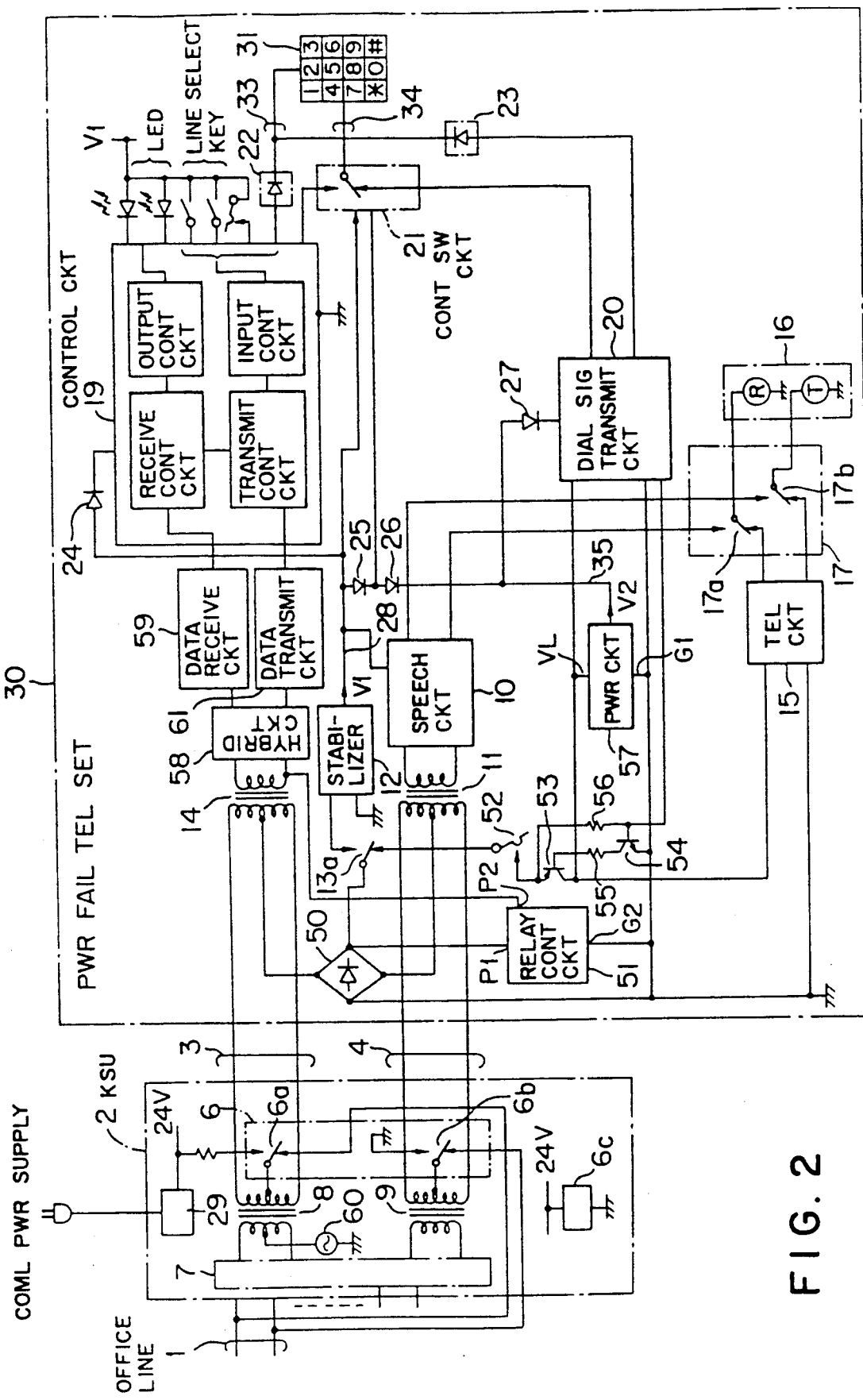
FIG. 2 is a block diagram showing a key telephone system provided with a power failure extension telephone set in which an embodiment of the dialing apparatus according to the present invention is incorporated.

FIG. 2 is a block diagram showing a key telephone system provided with a power failure extension telephone set in which an embodiment of the dialing apparatus according to the present invention is incorporated. In FIG. 2, the same reference numerals have been retained for similar elements having the same functions and shown in FIG. 1.

In FIG. 2, a power failure extension telephone set 30 is connected to a key service unit 2 via a control signal line 3 and a speech signal line 4. An office line 1 is connected to the key service unit 2. An appropriate well-known unit is usable for the key service unit 2.

Only the sections necessary to understand the gist of the present invention will be described hereinbelow.

A telephone interface unit 7 serves as a communication interface between the power failure extension telephone set 30 and a control unit, an exchange unit (both not shown) incorporated in the key service unit 2, and connected to control and speech signal lines 3 and 4 extending from the telephone set 30 via two transformers 8 and 9, respectively. A clock oscillator 60 is connected to a tap provided at a middle point of the transformer 8 on the interface unit side. This clock oscillator 60 generates a synchronizing clock transmitted to the power failure extension telephone set 30 via the control signal line 3. Further, a line switching circuit 6 is connected to two taps provided at middle points of the two transformers 8 and 9 on the signal line side, respectively. The line switching circuit 6 is composed of two relay switches 6a and 6b and a relay coil 6c. When the power supply of the key service unit 2 is live (in the ordinary power supply condition), since the relay switches 6a and 6b are energized and therefore the relay contacts are set to positions opposite to those shown in FIG. 2, the middle taps of the two transformers 8 and 9 are connected to the output (e.g. 24 V DC) of the power supply circuit 29 and the ground, respectively. Accordingly, a DC 24 V voltage is supplied to the telephone set 30 via the signal lines 3 and 4. On the other hand, when the power is not live (in the power failure condition), since the relay switches 6a and 6b are deenergized and therefore the relay contacts are set as shown, the office line 1 is connected to the signal lines 3 and 4. Accordingly, the telephone set 30 is directly connected to the office line 1. In this case, another power source (e.g. 48 V DC) is supplied to the telephone set 30 via the office line 1.

The power failure telephone set 30 is provided with a speech circuit 10 and a control circuit 19 both incorporated in the ordinary key telephone set and activated by power supplied from the key service unit 2 and with a telephone circuit 15 and a dial signal transmit circuit 20 both incorporated in the individual telephone set and activated by power supplied through the office line 1. The speech circuit 10 is connected to a speech signal line 4 via a transformer 11, and the control circuit 19 is connected to a control signal line 3 via a data receive circuit 59 and a data transmit circuit 61, a hybrid circuit 58, and a transformer 14 in sequence. These transformers 11 and 14 are formed with a middle tap, respectively. These two middle taps are connected to two input terminals of a rectifier bridge circuit 50 whose output terminals are connected to a relay switch 13a. Further, a microphone T and an earphone R arranged in a handset 16 are connected to two relay switches 17a and 17b of a switching circuit 17.

Further, a first input terminal P1 of a relay control circuit 51 is connected to an output terminal of the rectifier bridge 50, and a second input terminal P2 of the relay control circuit 51 is connected to a hybrid circuit side terminal of the transformer 14 to receive the synchronizing clock transmitted from the key service unit 2.

Figure 3:
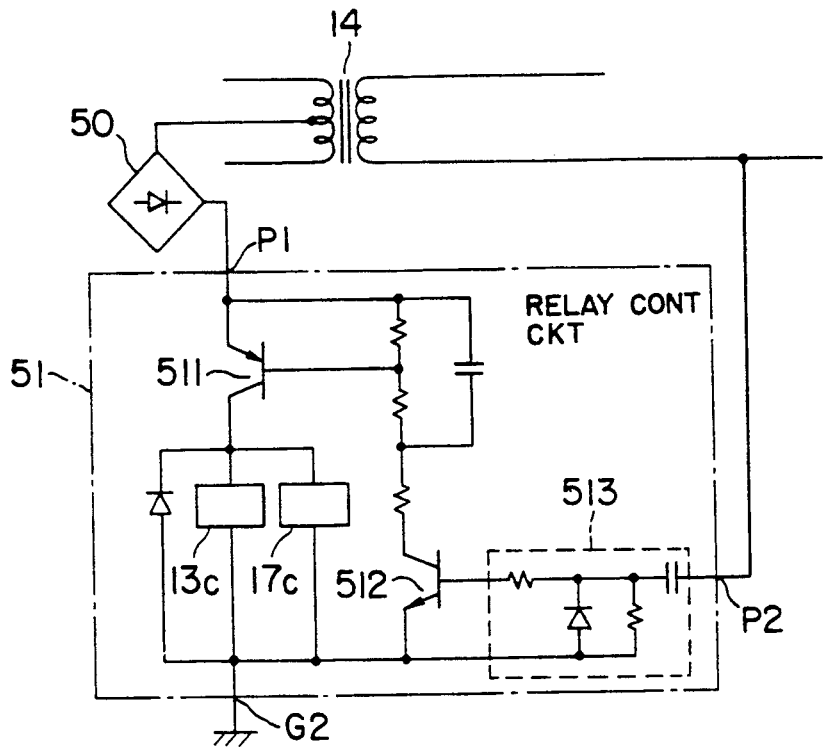
FIG. 3 is a circuit diagram showing a relay control circuit in the power failure extension telephone set shown in FIG. 2.

As shown in FIG. 3, the relay control circuit 51 includes a relay coil 13c for driving the relay switch 13a and a relay coil 17c for driving the relay switches 17a and 17b. These two relay coils 13c and 17c are connected to the first input terminal P1 via a transistor switch 511. The base potential of the transistor switch 511 is controlled by a transistor 512 whose base is connected to the second input terminal P2 via an integration circuit 513.

When power is supplied to the key service unit 2 (under the ordinary condition), the synchronizing clock from the key service unit 2 is inputted to the integration circuit 513 to set the output voltage thereof to a high level. Therefore, the transistor 512 is turned on to turn on the transistor switch 511, so that DC current is supplied from the rectifier bridge 50 to the relay coils 13c and 17c via the transistor switch 511. Accordingly, the relay switches 13a, 17a and 17b are energized to positions opposite to those shown in FIG. 2, so that an input terminal of the voltage stabilizer 12 is connected to an output terminal of the rectifier bridge 50 and further the handset 16 is connected to the speech circuit 10. Under these conditions, the DC 24 V voltage is supplied from the key service unit 2 to the voltage stabilizer 12. This voltage stabilizer 12 generates a stable DC voltage (e.g. 5 V) V1 supplied to the speech circuit 10 and the control circuit 19 via a line 28 as a driving power supply. This DC voltage V1 is also provided to a control switch 21 (described later) as a control signal, and is further supplied to the next stage via a diode 25 as driving power. Consequently, the telephone set 30 can function as an extension telephone set as described above.

On the other hand, when commercial power fails, since the synchronizing clock stops, no current is supplied to the relay coils 13c and 17c in the relay control circuit 51. Accordingly, the relay switches 13a, 17a and 17b are all deenergized as shown in FIG. 2, so that a power circuit 57 and a telephone circuit 15 are connected to the output terminal of the rectifier bridge 50 via series-connected hook switch 52 and transistor switch 53 for generating a dial pulse. Consequently, the telephone set 30 can function as an individual telephone set.

Figure 4:
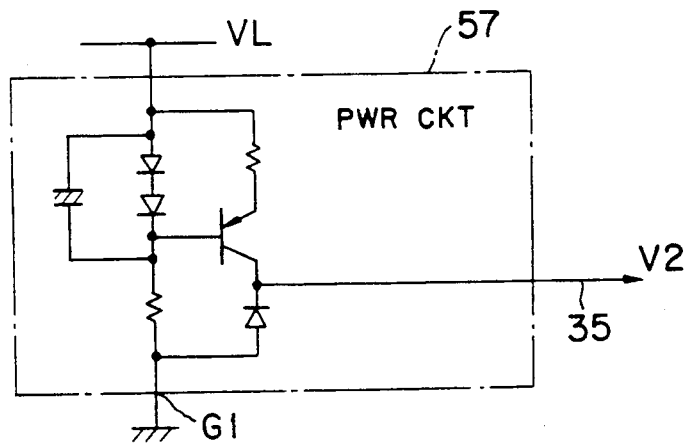
FIG. 4 is a circuit diagram showing a power supply circuit in the power failure extension telephone set shown in FIG. 2.

Under these individual telephone set conditions, when the handset 16 is off-hooked, since the hook switch 52 is turned on to apply a voltage (DC 48 V supplied through the office line 1) from the rectifier bridge 50 to the base of a drive transistor 54, the drive transistor 54 is turned on to turn on the transistor 53 for generating a dial pulse. Consequently, the telephone circuit 15 is electrically connected to the office line 1 via the rectifier bridge 50 so as to form a DC loop, and further a DC voltage VL (e.g. 48 V DC) is supplied from the office line 1 to the power circuit 57 via the rectifier bridge 50. The power circuit 57 is formed as shown in FIG. 4 and generates a DC voltage V2 (e.g. 3 V). This DC voltage V2 generated by the power circuit 57 is supplied to a dial signal transmit circuit 20 via a line 35 and a diode 27 to enable this dial signal transmit circuit 20. Further, this DC voltage V2 is supplied to the control switch circuit 21 via a diode 26 as driving power.

The dialing apparatus according to the present invention of the power failure telephone set 30 includes a dial switch 31, a control switch circuit 21 and two diode groups 22 and 23, as shown in FIG. 5 in more detail.

With reference to FIG. 5, the dial switch 31 is composed of 3×4 switch matrix 32 of single contact-layer structure.

This switch matrix 32 is composed of a column signal line 33 of three wires and a row signal line 34 of four wires, and a contact switch is provided for each intersection of two wires of the row and column signal lines. Further, a 3×4 key matrix (not shown) is arranged on the switch matrix 32 to activate each intersection switch.

Figure 6:
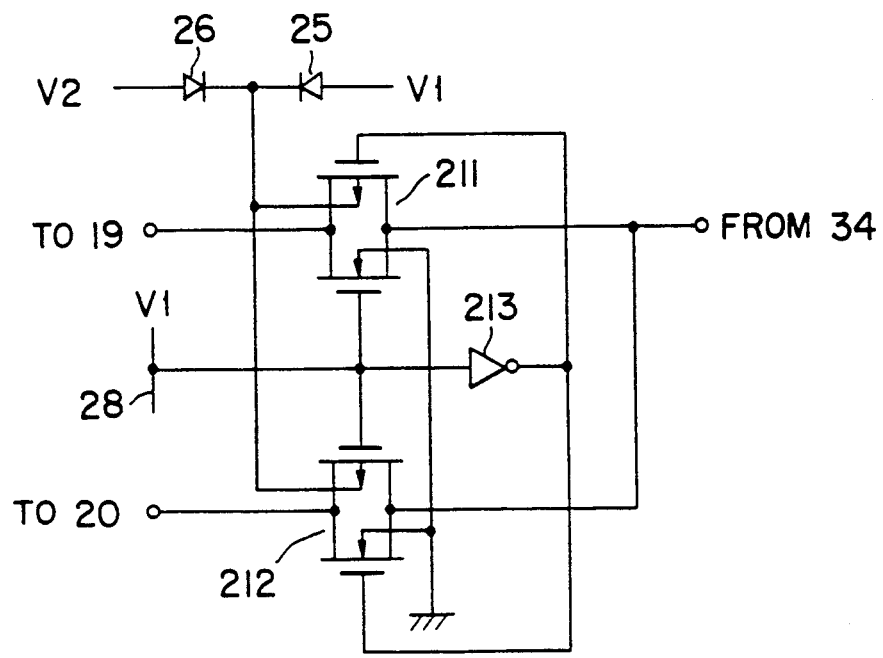
FIG. 6 is a circuit diagram showing each analog switch in the control switch circuit shown in FIG. 5.

The four-wire row signal line 34 of the switch matrix 32 is grounded (pulled down) via four resistors 36, respectively and further connected to the control switch circuit 21. The control switch circuit 21 includes four analog switches connected to the four-wire row signal line, respectively. Each analog switch is composed of two CMOS switches 211 and 212 controlled by a DC voltage V1 supplied through the power supply line 29, as shown in FIG. 6. The control switch 21 is driven by power supplied through the power supply line 28 via the diode 25 in the commercial power supply condition but by power supplied through the power supply line 35 via the diode 26 in the commercial power failure condition. In commercial power supply condition, a DC voltage V1 is supplied from the voltage stabilizer 12 to the control switch circuit 21, so that the CMOS switch 211 is turned on and the CMOS switch 212 is turned off to connect the row signal line 34 to the control circuit 19. On the other hand, in commercial power failure condition, the DC voltage V1 is not supplied, so that the CMOS switch 211 is turned off and the CMOS switch 212 is turned on to connect the row signal line 34 to the dial signal transmit circuit 20.

The column signal line 33 is connected to the control circuit 19 via a diode group 22 and also to the dial signal transmit circuit 20 via a diode group 23.

The power supply line 28 is connected to the control circuit 19 via the diode 24, and the power supply line 35 is connected to the dial signal transmit circuit 20 via the diode 27. Therefore, in the commercial power supply condition, the DC voltage V1 is supplied to the control circuit 19; on the other hand, in the commercial power failure condition, the DC voltage V2 is supplied to the dial signal transmit circuit 20. As described above, since power is supplied from the respective power supply lines 28 and 35 to circuits to be activated through the respective diodes, power is effectively supplied to only the circuits to be activated in each of the commercial power supply or failure condition, without supplying power to the unnecessary circuits, thus economizing power consumption.

The operation of the dialing apparatus will be described hereinbelow.

When power is supplied from the key service unit 2 to the dialing apparatus, the DC voltage V1 is outputted from the voltage stabilizer 12 to the power supply line 28 and supplied to the control circuit 19 and the control switch circuit 21 via the diodes 24 and 25, respectively. In response to the voltage V1, since each analog switch is changed over into the state opposite to that shown in FIG. 5, the row signal line 34 of the switch matrix 32 is connected to the control circuit 19. At the same time, since the control circuit 19 is activated by the power supply, three high-level voltage pulses are periodically outputted in sequence from the control circuit 19 to the three wires of the column signal line 33. Simultaneously, the control circuit 19 checks whether the high-level voltage pulse is generated at either one of the four wires of the row signal line 34, in order to check for a turned-on switch of the switch matrix 32 on the basis of the combination of a row signal wire through which the pulse is outputted and a column signal wire from which the pulse is detected. Numerical data corresponding to the checked line and column wires is transmitted to the key service unit 2 via the control signal line 3. In response to this numerical data, the key service unit 2 generates a select signal (dial pulse or MF signal) corresponding thereto and transmits it to the office line 2.

When power is not supplied from the key service unit 2, on the other hand, when the handset 16 is off-hooked, the DC voltage V2 is outputted from the power supply circuit 57 to the power supply line 35 and supplied to the dial signal transmit circuit 20 and the control switch circuit 21 via the diodes 27 and 26, respectively. In response to the absence of voltage V1, since each analog switch is changed over into the state as shown in FIG. 5, the row signal line 34 of the switch matrix 32 is connected to the dial signal transmit circuit 20. Since the dial signal transmit circuit 20 is activated by the power supply, the dial signal transmit circuit 20 detects a turn-on switch of the switch matrix 32 by the same operation as that of the control circuit 19, and generates a select signal (dial pulse or MF signal) corresponding thereto. The dial pulse turns the transistor 53 on or off via the drive transistor 54, so that the dial pulse is transmitted to the office line 1 via the signal lines 3 and 4. The MF signal is transmitted to the signal lines 3 and 4 via the transistor kept turned on, and further to the office line 1.

Here, the two diode groups 22 and 23 serve to electrically isolate the control circuit 19 from the dial signal transmit circuit 20 or vice versa, in order to prevent detection operation interference. In more detail, there exist two diodes 37 and 38 equivalently, as shown in FIG. 5, when the control circuit 19 is seen from the column signal line 33. In the same way, there exist two diodes 39 and 40 equivalently, when the dial signal transmit circuit 20 is seen from the column signal line 36. In other words, when the column signal line 33 is directly connected to the control circuit 19 and the dial signal transmit circuit 20, since current flows in the reverse direction from the column signal line 33 via the equivalent diode 39 in the dial transmit circuit 20 in the commercial power supply condition or via the equivalent diode 37 in the control circuit 19 in the commercial power failure condition, erroneous operation will be produced in the above-mentioned operation. In this embodiment, however, since the two diode groups 22 and 23 are provided between the column signal line 33 and the control and dial signal transmit circuits 19 and 20, it is possible to prevent erroneous operation by eliminating the reverse current passed from the column signal line 33 to the control and dial signal transmit circuits 19 and 20, respectively.

Figure 7:
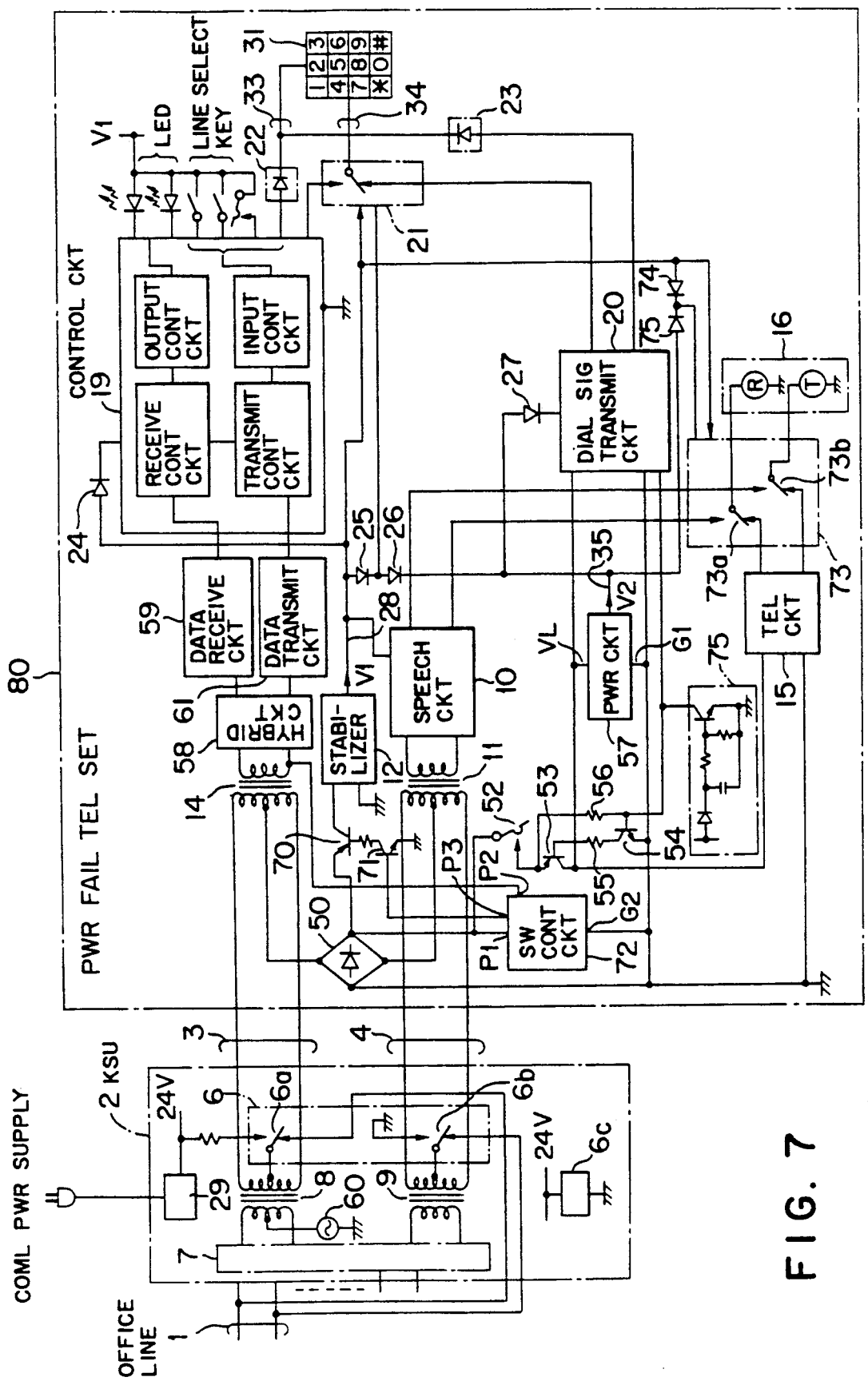
FIG. 7 is a block diagram showing a key telephone system provided with another power failure extension telephone set in which the embodiment of the dialing apparatus according to the present invention is incorporated.

FIG. 7 shows another embodiment of the power failure extension telephone set according to the present invention.

Figure 8:
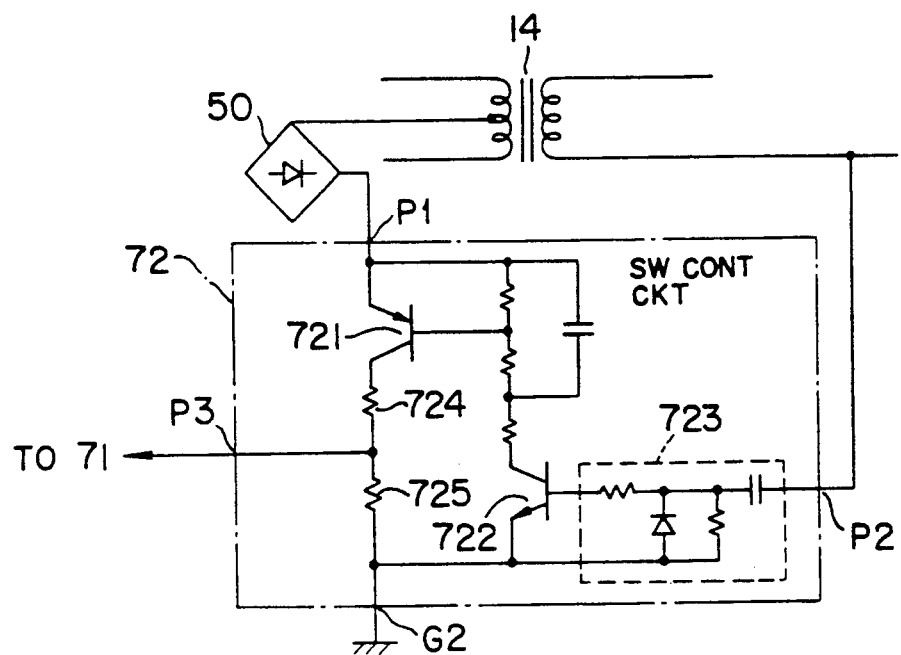
FIG. 8 is a circuit diagram showing a switch control circuit in the telephone set shown in FIG. 7.

In the telephone set 80 shown in FIG. 7, less costly transistor switches 70 and 73 are used instead of the relay switches 13a and 17 incorporated in the telephone set 30 shown in FIG. 2. The transistor switch 70 is turned on or off by the switch control circuit 72 via a driver transistor 71. The switch control circuit 72 is configured as shown in FIG. 8, which is basically similar to the relay control circuit 51 shown in FIG. 3. The switch control circuit 72 receives the synchronizing clock at an input terminal P2 thereof from the key service unit 2, only when the key service unit 2 is in the commercial power supply condition, to turn on the transistor 721, so that a high level voltage signal is outputted from an output terminal P3 of the switch control circuit 72. This outputted high level voltage signal is applied to the drive transistor 71 to turn on this transistor 71, so that the transistor switch 70 is turned on to connect the output terminal of the rectifier bridge 50 to the input terminal of the voltage stabilizer 12.

The transistor switch 73 includes two change-over switches 73a and 73b, each of which is configured in the same way as the analog switch shown in FIG. 6. Therefore, this transistor switch 73 connects the handset 16 to the speech circuit 10 in the commercial power supply condition but to the telephone circuit 15 in the commercial power failure condition.

In this telephone set 80, since the hook switch 52 is directly connected to the output terminal of the rectifier bridge 50, an output voltage of the rectifier bridge 50 is applied to the hook switch 52 not only in the commercial power failure condition but also in commercial power supply condition. In the commercial power supply condition, however, since a circuit 75 connects the base of the drive transistor 54 to ground to keep the transistor 53 turned off, even if the hook switch 52 is turned on when the handset 16 is off-hooked, the telephone set 80 will not be operated as an individual telephone set.

As described above, in the present invention, since the dial switch having a switch matrix of a single contact-layer structure is adopted, it is possible to simplify the switch structure and therefore increase the switch reliability. In addition, since an ordinary dial switch, which is the same as for the ordinary telephone sets, can be used, the dialing apparatus can be manufactured at low cost by mass production.

The present invention is not limited only to the above-mentioned embodiments, and can be changed into various modifications within the scope of the invention while not departing from the gist thereof.

What is claimed is:

1. A dialing apparatus for a power failure extension telephone set connected to a key service unit of a key telephone system, said telephone set being driven by power supplied through said key service unit in a power supply condition of said key service unit so as to function as an extension telephone set and being directly connected to an office telephone line in a power failure condition of said key service unit so as to function as an individual telephone set, comprising:

a dial switch having a switch matrix of a single contact layer structure;

a control switch circuit connected to said dial switch and switched according to said power supply condition or said power failure condition of said key service unit;

a control circuit, activated by power from said key service unit in said power supply condition of said key service unit and connected to said dial switch via said control switch circuit, for detecting a state of said dial switch to transmit a control signal to said key service unit; and a dial signal transmit circuit activated by power through said office telephone line in said power failure condition of said key service unit and connected to said dial switch via said control switch circuit, for detecting a state of said dial switch to transmit a call to said office telephone line.

2. The dialing apparatus of claim 1, wherein said switch matrix comprises a plurality of switches for mutually connecting plural column signal lines and plural row signal lines, respectively; said column signal lines being connected to both said control circuit and said dial signal transmit circuit; said row signal lines being selectively connected to said control circuit or said dial signal transmit circuit via said control switch circuit, according to said power supply condition or said power failure condition of said key service unit; said control circuit and said dial signal transmit circuit detecting a state of said dial switch by checking the mutual connection relationship between said column signal lines and said row signal lines; and isolating elements located in said column signal lines to electrically isolate said control circuit from said dial signal transmit circuit or vice versa.

3. A power failure extension telephone set connected to a key service unit of a key telephone system, said telephone set being driven by power supplied through said key service unit in a power supply condition of said key service unit so as to function as an extension telephone set and directly connected to an office telephone line in a power failure condition of said key service unit so as to function as an individual telephone set, comprising:
- a dial switch having a switch matrix of a single contact layer structure;
- a first control switch circuit connected to said dial switch and switched according to said power supply condition or said power failure condition of said key service unit;
- a control circuit, activated by power from said key service unit in said power supply condition of said key service unit and connected to said dial switch via said first control switch circuit, for detecting input signals from said dial switch to transmit a control signal to said key service unit;
- a dial signal transmit circuit, activated by power through said office telephone line in said power failure condition of said key service unit and connected to said dial switch via said first control switch circuit, for detecting input signals from said dial switch to transmit a call to said office telephone line;
- a second control switch circuit connected to a microphone and an earphone and switched according to said power supply condition or said power failure condition of said key service unit;
- a speech circuit, activated by power from said key service unit in said power supply condition and connected to said microphone and said earphone via said second control switch circuit, for connecting said microphone and earphone to said key service unit; and
- a telephone circuit, activated by power through said office telephone line in said power failure condition of said key service unit and connected to said microphone and said earphone via said second control switch circuit, for connecting said microphone and said earphone to said office telephone line.

4. The power failure extension telephone set of claim 3, which further comprises:
- a connection line provided between said telephone set and said key service unit, for supplying power from said key service unit to said telephone set in said power supply condition of said key service unit and supplying power from said office telephone line to said telephone set in said power failure condition of said key service unit;
- a first power supply circuit for supplying power to both said speech circuit and said control circuit;
- a second power supply circuit for supplying power to said dial signal transmit circuit; and
- a distributing circuit connected to said connection line, for selectively distributing power supplied through said connection line to said first and second power supply circuits according to said power supply condition or said power failure condition of said key service unit.

5. The power failure telephone set of claim 4, wherein said distributing circuit is a relay switch for selectively connecting said connection line to said first and second power supply circuits, according to said power supply condition or said power failure condition of said key service unit.

6. The power failure telephone set of claim 4, wherein said distributing circuit comprises a first transistor switch for connecting said connection line to said first power supply circuit in said power supply condition of said key service unit, and a second transistor switch for connecting said connection line to said second power supply circuit in said power failure condition of said service unit.

* * * * *